Aug. 26, 1941.            H. KLEMM                 2,254,152
                     AIRCRAFT CONSTRUCTION
                       Filed June 20, 1939
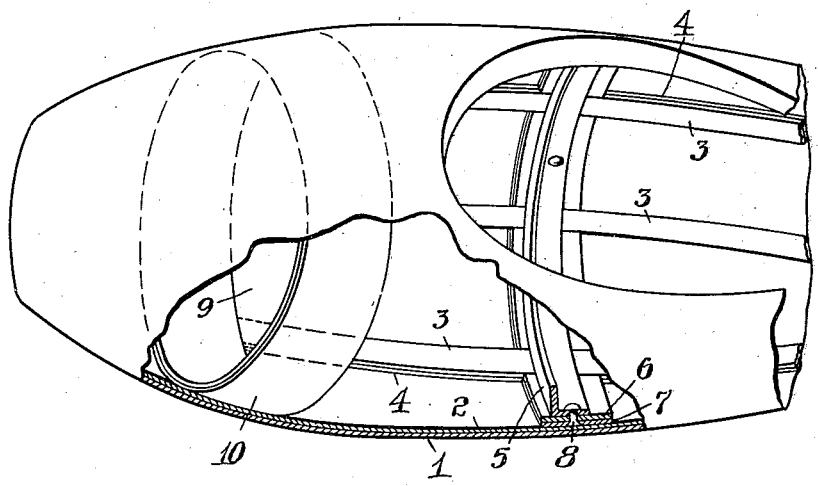
Hanns Klemm
INVENTOR
BY
his ATTORNEY.

Patented Aug. 26, 1941

2,254,152

UNITED STATES PATENT OFFICE 2,254,152

AIRCRAFT CONSTRUCTION

Hanns Klemm, Boblingen, near Stuttgart, Germany, assignor to William Rhodes Davis, New York, N. Y.

Application June 20, 1939, Serial No. 280,026
In Germany April 29, 1938

6 Claims. (Cl. 244—119)

The present invention relates to aircraft construction.

One object of the invention is to produce load carrying shells for aircraft fuselages, wings and the like in which a stressed skin having a metallic outer surface is stiffened by metallic stabilizing members secured to said skin by gluing.

Another object of the invention is to provide a load carrying aircraft shell which combines a very light weight with a high resistance to compressive and bending stresses and with a sufficient local stiffness and local strength to prevent buckling or denting under aerodynamic or handling stresses.

A still further object of the invention is to construct a load carrying shell with metallic outer surface which can be easily and cheaply manufactured by mass production methods under partial or total elimination of riveting operations.

A specific object of the present invention is to design a load carrying aircraft shell with metallic outer surface and metallic stabilizing members which can be built by the method described and claimed in U. S. Patent 2,168,280.

These and other objects are accomplished by the arrangement and combination of parts set forth in the following detailed description, defined in the appended claims and illustratively exemplified in the accompanying drawing, the single figure of which is a perspective view partly in section of a part of an aircraft fuselage according to the invention.

In the aircraft fuselage illustrated, the outer skin consists of sheet metal strips 1 having glued to their inner faces a wood veneer 2 of 0.3–0.5 millimeter thickness. The strips 1, 2, extend over the entire length of the fuselage, and adjacent strips 1, 2, contact one another along butt joints. Seam strips 3 of sheet metal, each having an outwardly facing wood veneer 4, are glued to the inside of the wall strips 1, 2, wood against wood, and serve as longitudinal stabilizing members. The seam strips 3, 4, cover the butt joints for the major part of their length. Transverse stabilizing members formed of light metal angle-profiles 5 are disposed at right angles to the strips 1, 2. Metal strips 6 with outwardly facing wood veneer 7 are secured to the angle-profiles 5 by means of rivets 8 and the outwardly facing wood surfaces of the strips 6, 7, are glued, wood against wood, to the outer skin 1, 2. The strips 6, 7, are discontinued at the points where the seamstrips 3, 4, pass below the angle pieces 5. A fire bulkhead 9 is formed from a sheet of metal having a flange 10, and is provided with a wood veneer which faces rearwardly and, on the flange 10, outwardly. The wood veneer on the flange 10 is glued directly to the outer skin 1, 2. The seam strips 3, 4, terminate at the rear edge of the bulkhead 9.

I claim:

1. A load carrying aircraft shell or the like, comprising a stressed skin of wood veneered sheet metal arranged with the wood veneer facing inwardly, and stabilizing members secured to the inner surface of said skin, each of said stabilizing members including a metal element and a wood veneer secured to the outer surface thereof, the wood veneer of said stabilizing members being glued to the wood veneer of said skin.

2. A load carrying aircraft shell, as claimed in claim 1, in which said skin consists of elongated wall strips of wood veneered sheet metal extending lengthwise of the shell and contacting one another along elongated joints, and said stabilizing members include seam strips of wood veneered sheet metal glued to the inside of said skin in wood against wood contact so as to cover said joints for the major parts of their lengths.

3. A load carrying aircraft shell or the like, comprising a stressed skin of wood veneered sheet metal arranged with the wood veneer facing inwardly, and stabilizing members secured to the inner surface of said skin, said stabilizing members including metal elements having strips of wood veneered sheet metal secured to their outer surfaces with the wood veneer facing outwardly, the wood veneer of said strips being glued to the wood veneer of said skin.

4. A load carrying aircraft shell, as claimed in claim 3, in which said wood veneered sheet metal strips are riveted to said metal elements.

5. A load carrying air-craft shell, as claimed in claim 3, in which said metal elements extend transversely of the shell.

6. A load carrying air-craft shell or the like, comprising a stressed skin of wood veneered sheet metal arranged with the wood veneer facing inwardly, longitudinal stabilizing members consisting of strips of wood veneered sheet metal extending lengthwise of the shell with the wood veneer in contact with the inner surface of the latter, and transverse stabilizing members including metal elements disposed across said longitudinal stabilizing members in contact with the inner surfaces thereof and being secured to said longitudinal stabilizing members at the intersections, and strips of wood veneered sheet metal secured to and covering the outer surfaces of said metal elements between the intersections thereof with said longitudinal stabilizing members, the wood veneer of all said strips being glued to the wood veneer of said skin.

HANNS KLEMM.